UNITED STATES PATENT OFFICE.

PETER DIEDRICH HINRICH OHLHAVER, OF SANDE, GERMANY.

PROCESS OF MANUFACTURING DRIED YEAST.

1,020,306.  Specification of Letters Patent.  Patented Mar. 12, 1912.

No Drawing.  Application filed August 24, 1911. Serial No. 645,829.

*To all whom it may concern:*

Be it known that I, PETER DIEDRICH HINRICH OHLHAVER, a subject of the Emperor of Germany, residing at Sande, Germany, have invented certain new and useful Improvements in Processes of Manufacturing Dried Yeast, of which the following is a specification.

This invention relates to a process of manufacturing dried yeast by which the yeast undergoes a preliminary maturing operation before being submitted to the drying process, and has for its object to retain the full vitality of the yeast and as a consequence its maximum raising power.

Yeast is a fungus of microscopical size, which can be cultivated, and on this account has become of eminent importance in connection with the production of spirits and beer, and for all kinds of baking purposes.

Yeast is mostly supplied to users, especially for baking purposes, in compressed condition but is liable to deteriorate after a very short time, in consequence of which attempts have been made to preserve it by drying but hitherto with little success. It is quite possible to dry the yeast, but during the drying process the vitality of the yeast is destroyed, and consequently dried yeast has relatively a very small raising power.

All attempts to dry the yeast without injuring its life have hitherto failed because the yeast has not first been brought to a proper state of maturity for the act of drying.

Yeast consists mainly of albuminous substances, carbohydrates, fats, and salts. In the fresh yeast these substances appear in forms which do not permit of the drying of the yeast without great injury to it. Only after the yeast has been subjected to treatment causing a transformation of these substances, which brings them to a special maturity for drying purposes are the proper conditions for the application of a drying process attained.

The various constituents of yeast possess astonishingly well organized functions. The organisms carrying out the work of the yeast are called enzymæ; they consist of the invertase, the zymase, the oxydase, and the peptase. Of these enzymæ the invertase and the zymase are technically the most important. The invertase transforms the higher kinds of sugar into lower ones and the zymase ferments the lower kinds producing alcohol and carbonic acid. As concerns the life of the yeast however the two other enzymæ, the oxydase and the peptase are the most important. The peptase provides the yeast with its principal ingredient, namely; diffusible albumin, and the oxydase builds up from the diffusible albumin thus supplied the life preserving plasma albumin, the organized albumin from which under normal conditions of development the young cell is created. Simultaneously the oxydase causes the necessary respiration to give an active building up of the organism, and for this respiration, partly oxygen from the air dissolved in the water is employed, and partly oxygen derived from certain chemical combinations.

In order to attain the state of maturity necessary to successfully apply the drying process above referred to the building up element *i. e.* the oxydase, must be strengthened as much as possible so as to enable it to transform the reserve albumin and to expel, by respiration, the other less important reserve substances.

The state of maturity necessary for the purpose of drying is reached when the reserve albumin in the yeast cell has been entirely, or almost entirely, transformed into plasmatical albumin.

The oxydase requires oxygen for its building up activities, and is considerably strengthened if it can absorb large quantities of that element. Oxydase absorbs oxygen from water with especial ease and great advantage, consequently water may be said to be a necessary ingredient for the development of yeast.

All the conditions necessary to bring yeast to the maturity necessary for the drying process will be present if the yeast is finely distributed in water through which air is passing, as by this disposition abundant quantities of oxygen for the transformation processes of the oxydase are readily obtainable. The yeast thus finely distributed in water is so to speak washed by the air, and the oxydase being thus actuated to give very active respiration is thereby strengthened. The respiration at the same time expels a part of the reserve substances but transforms the reserve albumin into the life preserving plasma albumin and thus brings about the required state of maturity for the drying process.

To what extent the ripe state of maturity is brought about quickly, or otherwise, depends partly upon the whole constitution of the yeast cell which is subject to considerable fluctuations, and partly upon the quantity of reserve substances contained in the yeast cells which have either to be transformed, or expelled by respiration. In some cases the necessary degree of ripeness was obtained in a few hours, in other cases the treatment required about 70 hours; in most cases however from 24 to 48 hours were required for the air-washing treatment.

When dissolving the yeast in water for the purpose of washing it with air, it is of advantage to utilize an excess of water, since the thinner the solution the more oxygen is there at the disposal of each yeast cell.

The ebullient motion of the liquid caused by the continuous passage of air, favors at the same time the desired transformation of the substances within the yeast cell.

Small additions of any form of sugar, or sugary combinations, to the water in which the air-washing of the yeast takes place, are of advantage. The sugar renders it easier for the oxydase to build up the plasma albumin, simultaneously influencing in an active manner the sugar transforming organ of the yeast; namely, the zymase. Starch also acts advantageously, or still better, substances which contain starch in large quantities, such as flour, malt, pulverized bread, and the like, when added to the water in which the yeast is being washed with air, or alternatively the air-washed yeast may be mixed with these substances. The yeast is then dried together with such substances.

The influence which the state of maturity of the yeast thus obtained exercises upon the drying is best shown by a few examples: A normal pressed yeast, as heretofore used in the trade, possessed while in the fresh condition a raising power of 710 c.cm. This fresh yeast was carefully dried in an air current and the dried yeast thus obtained had a raising power of 185 c.cm. The same fresh yeast was subsequently brought first to the state of maturity for the drying process as set out herein, and then dried in the usual manner by the air current, and this dried yeast had a raising power of 2595 c.cm. or equivalent to a raising power 14 times as large as the dried yeast to which the state of maturity had not been imparted.

Another commercial fresh yeast raised 870 c.cm.; in a dried state without the ripening treatment 420 c.cm.; but by applying the above described ripening treatment the dried yeast obtained from the same fresh yeast had a raising power of 2830 c.cm. In each case above mentioned the usual quantities and periods for testing yeast were observed namely; a weight of 10 grams and a testing period of two hours.

What I claim as my invention and desire to secure by Letters Patent is:—

1. The herein described process of manufacturing dried yeast, which consists in subjecting the fresh yeast to a maturing treatment with water containing air for a sufficient time to transform the reserved albumin of the yeast cells into plasma albumin, and then drying such matured yeast.

2. The herein described process of manufacturing dried yeast, which consists in subjecting the fresh yeast to a maturing treatment with aerated water and a carbohydrate, and then drying such matured yeast.

3. The herein described process of manufacturing dried yeast, which consists in subjecting the fresh yeast to a maturing treatment with aerated water and a product containing starch, and then drying such matured yeast.

4. The herein described process of manufacturing dried yeast, which consists in subjecting the fresh yeast to a maturing treatment with aerated water and an excess of a carbo-hydrate, and then drying such matured yeast and the excess carbo-hydrate.

5. The herein described process of manufacturing dried yeast having an augmented raising power, which consists in oxygenating the fresh yeast to transform the reserved albumin of the yeast cells into plasma albumin, continuing such treatment for storing oxygen in the oxydase of the yeast, and then drying the yeast.

In testimony whereof I have affixed my signature in presence of two witnesses.

PETER DIEDRICH HINRICH OHLHAVER.

Witnesses:
 ERNEST H. L. MUMMENHOFF,
 IDA CHRIST. HAFERMANN.